(No Model.)
E. T. DAVIES.
Lumber Sorter.
No. 238,220. Patented March 1, 1881.
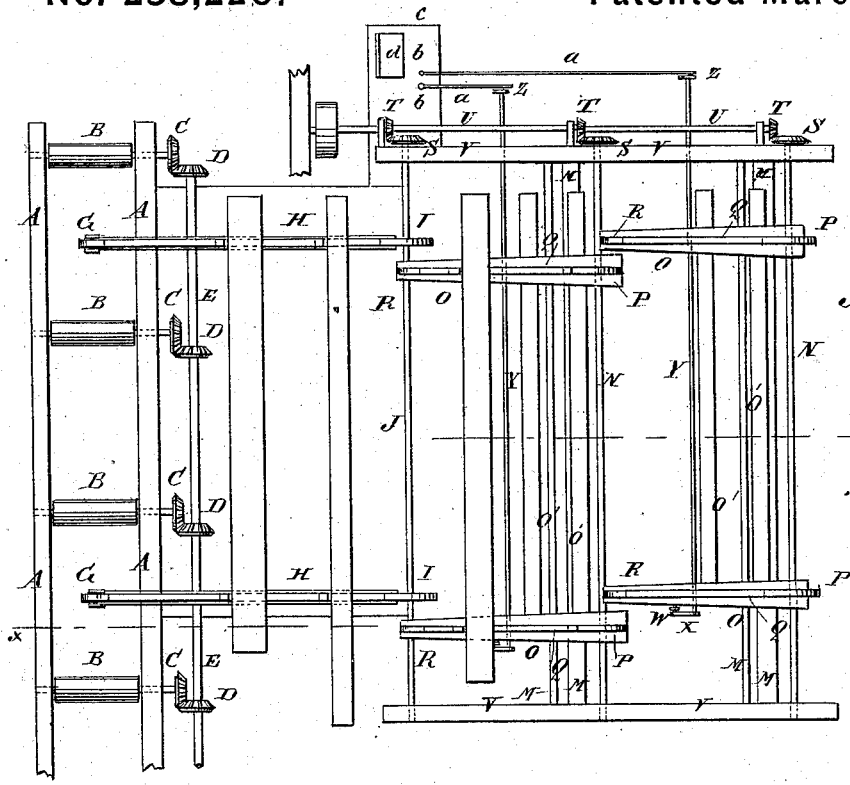
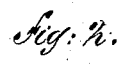
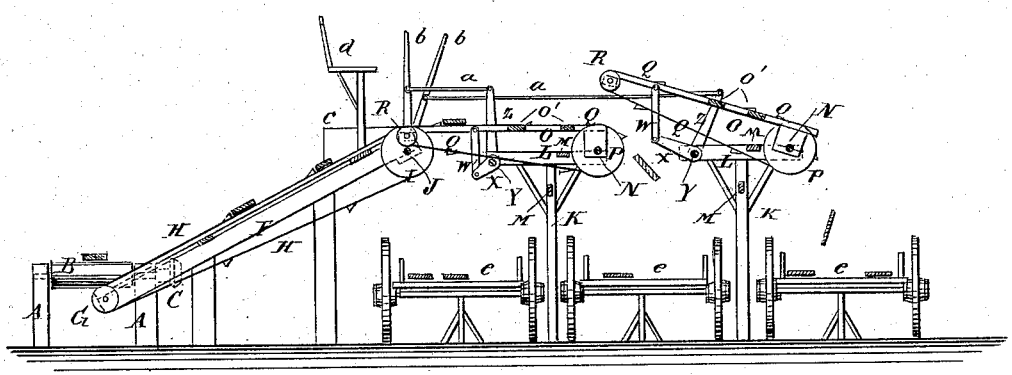
WITNESSES:
Chas. Nien
C. Sedgwick
INVENTOR:
E. T. Davies
BY Munn & Co
ATTORNEYS.

UNITED STATES PATENT OFFICE.

EVAN T. DAVIES, OF MANISTEE, MICHIGAN.

LUMBER-SORTER.

SPECIFICATION forming part of Letters Patent No. 238,220, dated March 1, 1881.

Application filed December 21, 1880. (No model.)

*To all whom it may concern:*

Be it known that I, EVAN T. DAVIES, of Manistee, in the county of Manistee and State of Michigan, have invented a new and useful Improvement in Lumber-Sorters, of which the following is a specification.

Figure 1 is a plan view of the improvement. Fig. 2 is a sectional side elevation taken through the line $x\ x$, Fig. 1.

Similar letters of reference indicate corresponding parts.

The object of this invention is to furnish sorters for separating lumber as it comes from a saw-mill into different grades, and depositing each grade separately or upon its own wagon, thus avoiding handling the lumber.

The invention consists in the combination, with the ordinary delivery-rollers of a saw-mill, of a series of separate endless chain-carriers capable of being arranged together to deliver the lumber at the farthest point desired, and also of being separated so as to deliver the lumber at intermediate points, as will be hereinafter fully described.

A represents a frame placed at the tail of a saw-mill, and to which are pivoted a series of rollers, B, to receive the lumber as it comes from the saw.

To the journals of the rollers B are attached beveled gear-wheels C, the teeth of which mesh into the teeth of beveled gear-wheels D attached to a shaft, E. The shaft E revolves in bearings attached to the frame A, or to other suitable supports, and is driven from the driving mechanism of the saw-mill or other convenient power.

To the side of the frame A is attached an inclined frame or apron, F, the lower edge of which projects below the level of the rollers B, and has chain wheels or pulleys G pivoted to it.

H are endless chains which pass around the chain-wheels G, and around chain-wheels I attached to a shaft, J, which revolves in bearings attached to the upper edge of the frame or apron F, or other suitable support.

K are posts, one or more sets of which are used, and to the upper ends of which, and about upon a level with the upper edge of the inclined frame or apron F, are attached cross-heads L, the cross-heads of each set being connected by bars M.

To the outer ends of the cross-heads of each set is pivoted a shaft, N, to which are pivoted the outer ends of skids O, connected by cross-bars O′, of such a length that the inner ends of the first set of skids reach to the upper edge of the inclined frame or apron F, and the inner ends of the skids of each succeeding set overlap the outer ends of the skids of the preceding set.

To the shaft N are attached chain-wheels P, around which pass endless chains Q. The endless chains Q also pass around chain-wheels R, pivoted to the inner ends of the skids O.

To one end of each of the shafts J N is attached a beveled gear-wheel, S, the teeth of which mesh into the teeth of a beveled gear-wheel, T, attached to the shaft U. The shaft U revolves in bearings attached to a bar, V, secured to the ends of the bars M; and to the said shaft U is attached a pulley to receive a driving-belt, so that the said shaft may be driven from the driving mechanism of the saw-mill to drive all the endless chains Q H.

To each skid O, near its inner end, is pivoted the upper end of a connecting-bar, W, the lower end of which is pivoted to the outer end of an arm, X. The inner ends of the arms X of each set of skids are rigidly attached to a shaft, Y, which works in bearings in the inner ends of the corresponding set of cross-heads L.

To the end of each shaft Y is rigidly attached an upwardly-projecting arm, $z$, to the upper end of which is pivoted the end of a connecting-rod, $a$. The other end of each connecting-rod $a$ is pivoted to a lever, $b$, the lower ends of which levers are pivoted to a platform, $c$, attached to the frame-work of the machine.

To the platform $c$ is attached a seat, $d$, for the attendant who operates the levers $b$ to raise and lower the skids.

With this construction, as the lumber is sawed and carried back upon the rollers B an attendant pushes it sidewise upon the endless chains H, by which it is carried up the inclined frame or apron F. As the lumber approaches the upper edge of the inclined frame or apron F the attendant upon the platform $c$ inspects it, and operates one of the levers, $b$, to raise the proper set of skids O to allow it to drop upon the wagon $e$ which receives that particular grade, a wagon, e, being placed beneath the upper edge of the inclined frame or apron F, and beneath the outer ends of the several sets of skids O, as shown in Fig. 2.

With this improvement the lumber can be sorted without being handled.

Having thus described my invention, I claim as new and desire to secure by Letters Patent—

1. In a lumber-sorter, the combination, with the saw-mill delivery-rolls, of the series of separate endless-chain carriers, made adjustable and adapted to deliver the lumber at varying distances, as described.

2. The combination, with the rolls B, of the endless apron F and chains H, extending at the lower end under rollers B, the connected cross-heads M L, attached to posts K, the shaft N, the pivoted skids O, overlapping each other, and the endless chains Q, passing over shaft-wheels P and skid-wheels R, to operate together as described.

3. In a lumber-sorter, the combination, with the shafts J Y, that carry the driving-chain wheels I P, of the endless chains H Q, of the gear-wheels S T, and the shaft U, substantially as herein shown and described, whereby the several endless chains are driven at the same time, as set forth.

EVAN T. DAVIES.

Witnesses:
R. R. BLACKER,
J. M. RAMSDELL.